US005864665A

United States Patent [19]
Tran

[11] Patent Number: 5,864,665
[45] Date of Patent: Jan. 26, 1999

[54] AUDITING LOGIN ACTIVITY IN A DISTRIBUTED COMPUTING ENVIRONMENT

[75] Inventor: Trung M. Tran, Williamson, Tex.

[73] Assignee: International Business Machines Corporation, Armonk, N.Y.

[21] Appl. No.: 705,478

[22] Filed: Aug. 20, 1996

[51] Int. Cl.⁶ .................................................. G06F 12/00
[52] U.S. Cl. ........................................ 395/187.01; 380/25
[58] Field of Search .............................. 380/3, 4, 23, 25; 395/605, 186, 187.01, 188.01, 490, 491

[56] References Cited

U.S. PATENT DOCUMENTS

| | | |
|---|---|---|
| 4,757,533 | 7/1988 | Allen et al. . |
| 5,032,979 | 7/1991 | Hecht et al. . |
| 5,138,712 | 8/1992 | Corbin .................................. 395/186 |
| 5,339,403 | 8/1994 | Parker . |
| 5,373,559 | 12/1994 | Kaufman et al. . |
| 5,459,871 | 10/1995 | Van Den Berg . |
| 5,497,421 | 3/1996 | Kaufman et al. . |

OTHER PUBLICATIONS

Aditham, R., A. Jindal, N. Nasudevan and J. Yarsa, "Distributed Auditing in a Distrubted Computing Environment," IBM TDB, vol. 36, No. 10, pp. 477–478, Oct. 1993.

"Message–Passing Systems Take on RPCs in Middleware Arena", Nov. 1992, Communications Week, p. 41.

*Primary Examiner*—Albert DeCady
*Attorney, Agent, or Firm*—Jeffrey S. LeBaw; David H. Judson

[57] ABSTRACT

A method of auditing login activity in a distributed computing environment in which users attempt to log into the environment from workstations using an authentication protocol in which a ticket request and pre-authentication data are communicated from the workstation to an authentication server. The pre-authentication data includes information establishing an identity of the user and providing a proof that the user has entered a password during the login attempt. The method is effected as a background process during the login, and is initiated after the ticket has been returned to the workstation from the authentication server to avoid RPC deadlock. To audit the login, information from the pre-authentication data is used to obtain a simple name of the user. The simple name is then converted into a global format and evaluated. If the name is recognized, it is passed along with the workstation address to an audit API. If the name is invalid, the audit is suspended. After the information is recorded or the audit suspended, as the case may be, process control is returned to the login routine. Preferably, the routine is implemented within the security service of the distributed computing environment.

20 Claims, 3 Drawing Sheets

5,864,665

AUDITING LOGIN ACTIVITY IN A DISTRIBUTED COMPUTING ENVIRONMENT

TECHNICAL FIELD

The present invention relates generally to data recording and, more particularly, to auditing login activity within a security service of a distributed computing environment (DCE).

BACKGROUND OF THE INVENTION

Computers are often connected into a local area network (LAN) to enable exchange of information and sharing of resources. A local area network provides a distributed computing environment in which users can access distributed resources and process applications on multiple computers. One such computing environment, called DCE, has been implemented using software available from the Open Systems Foundation (OSF). In a distributed computing environment, a group of machines is typically referred to as a "domain." An OSF DCE domain is called a "cell." A DCE cell can be a complex environment involving hundreds of machines in many locations.

DCE includes a "Security Service" that provides secure communications and controlled access to resources in the environment through authentication, secure communication and authorization. To this end, the Service includes a Registry Service, an Authentication Service (AS), a Privilege Service (PS), an Access Control List (ACL) Facility and a Login Facility. The identity of a DCE user or service is verified, or authenticated, by the Authentication Service (AS) using a well-known authentication protocol called Kerberos. By integrating DCE remote procedure call (RPC) services with the DCE Security Service, network communications may be encrypted or otherwise checked for tampering. Access to resources is controlled by comparing the "credentials" conferred to a user by the Privilege Service with the rights to the resource, which are specified in the resource's Access Control List. The Login Facility initializes a user's security environment, and the Registry Service manages the information (such as user accounts) in the DCE Security Service database.

Known DCE implementations also include a centralized audit service. In DCE, all RPC-based servers are considered audit service clients. Typically, audit records are generated in the audit service through the use of an audit "code point" in a particular routine. The code point calls an audit API, which then passes information to the audit service for logging. An audit code point generally corresponds to an operation or function offered by an application server for which audit is required. Thus, for example, in a banking application, a server may have a code point set for opening or closing an account, withdrawing or depositing funds or a funds transfer operation.

In DCE, there is a set of code points in the Security Service that, theoretically, are useful for auditing the authentication operation. Several of these code points, however, are also designed to be used by the audit service to validate security information (so-called "tickets") that encode audit record data. Thus, it has not been possible to use the authentication interface as it was designed because whenever the DCE Security Service calls the audit API at a code point (e.g., to record a login), the audit API calls the Security Service to decode audit record data. This results in an RPC "deadlock." A similar RPC "bottleneck" occurs if the interface attempts to write an audit record for an unrecognized or invalid global (i.e. intercell) name that has been parsed from the user's login name. Because of these deadlock problems, it has not been possible to perform login auditing within a distributing computing environment, let alone from within the confines of the DCE Security Service.

This invention solves this important problem.

BRIEF SUMMARY OF THE INVENTION

It is a primary object of the invention to audit login activity within a distributed computing environment.

It is another object of the invention to use a security service of a distributed computing environment to record user login activity.

It is a further object of the invention to integrate an audit mechanism into the login facility of a security service of a distributed computing environment.

It is yet another object of the invention to use "pre-authentication" data submitted during a user login protocol to track login activity to a security service.

Another object of the invention is to audit login activity in a distributed computer environment that manages remote procedure call (RPC) deadlocks and bottlenecks that would otherwise interfere with the audit protocol.

It is another more general object of this invention to provide an audit mechanism within a Security Service of DCE.

It is yet still another more specific object of the invention to use pre-authentication data and RPC deadlock avoidance to facilitate the auditing of login activity to a DCE Login Facility.

It is still another object of the invention to initiate such auditing activity during the actual login protocol itself. Preferably, this is accomplished during the login routine by transferring process control to an audit routine during the login attempt and then returning control back to the login routine after the audit record is written or the audit is otherwise suspended.

It is yet another object of the invention to provide auditing of login activity that is resistant to remote procedure call (RPC) deadlocks that would otherwise inhibit use of the DCE authentication audit interface.

These and other objects are provided in a method of auditing login activity in a distributed computing environment in which users attempt to log into the environment from workstations using an authentication protocol in which a ticket request and pre-authentication data are communicated from the workstation to an authentication server. The pre-authentication data includes information establishing an identity of the user and providing a proof that the user has entered a password during the login attempt. The method begins during a login routine by determining whether a ticket has been returned from the server in response to the ticket request. If so, the login routine is suspended, and information derived from the pre-authentication data is then used to initiate a login audit. Thereafter, a determination is made whether naming information can be provided to an audit service of the distributing computing environment without causing RPC deadlock. If so, an audit API is called to pass the naming information to the audit service and process control is then returned to the login routine. Alternatively, if the naming information cannot be provided without causing RPC deadlock, the audit is suspended and process control is returned to the login routine without writing an audit record for the particular login attempt.

Thus, generalizing the preferred method steps, a determination is first made as to whether a ticket has been returned from the server in response to the ticket request. If so, the login routine is suspended and a login audit protocol is initiated using information derived from pre-authentication data in the Kerberos protocol. Process control is then returned back to the login routine after processing the login audit protocol, either by writing an audit record or suspending the audit due to the possibility of RPC deadlock.

Thus, the preferred method is carried out as a background process during the login, and it is initiated after the ticket has been returned to the workstation from the authentication server to avoid RPC deadlocks. To attempt audit of the login, information from the pre-authentication data is used to obtain a simple name of the user. The simple name is then converted into a global format and evaluated. If the name is recognized, it is passed along with the workstation address to an audit API, which passes the information to the audit service for logging. After the information is recorded, process control is returned to the login routine. If, however, the global name is not recognized, the attempt to write the audit record is terminated to avoid RPC deadlocks that might otherwise occur.

In the preferred embodiment, the invention is implemented in an OSF distributed computing environment security service having Kerberos authentication.

According to another feature, the invention is implemented in a computer connected to a distributed computing environment having an authentication server. The computer includes a processor, an operating system, and program control means run by the operating system for enabling a user of the computer to log into the environment and to have the login attempt saved to an audit record. The program control means may be encoded on a substrate of a computer-readable storage medium, such as a floppy diskette.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
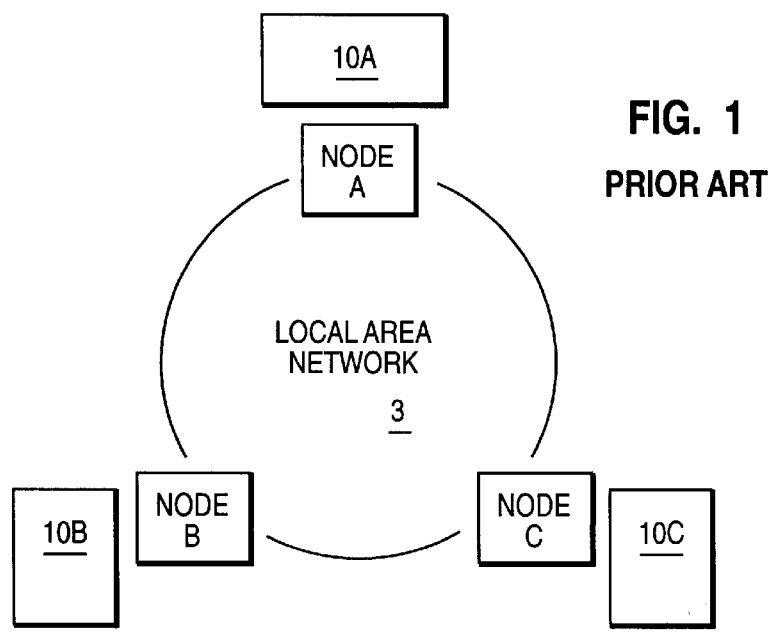
FIG. 1 illustrates a simplified diagram showing a known distributed computing environment in which the present invention is implemented.

A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture. At any of the nodes A, B or C there may be a processing system 10A, 10B or 10C. Each of these systems may be a single user system or a multi-user system.

Each of the processing systems is a computer, referred to herein sometimes as a "machine." For example, each computer may be a RISC System/6000® (a reduced instruction set or so-called RISC-based workstation) running the AIX® (Advanced Interactive Executive) operating system. The AIX® operating system is compatible at the application interface level with AT&T's UNIX operating system, version 5.2. The various models of the RISC-based computers are described in many publications of the IBM Corporation, for example, RISC System/6000, 7073 and 7016 POWERstation and POWERserver Hardware Technical Reference, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Alternatively, each computer may be an IBM® PS/2® running under the OS/2® operating system. For more information on the PS/2 line of computers and the OS/2 operating system, the reader is directed to Technical Reference Manual Personal Systems/2 Model 50, 60 Systems IBM Corporation, Part No. 68x2224 Order Number S68X-2224 and OS/2 2.0 Technical Library, Programming Guide Volumes 1–3 Version 2.00, Order Nos. 10G6261, 10G6495 and 10G6494.

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers interconnected by other networks than the Ethernet LAN or IBM's TCP/IP.

Returning now back to FIG. 1, each of the processing systems 10 may operate as a "client" or "server," depending on whether it is requesting or supplying services. Each of these systems may be a single user system or a multi-user system with the ability to use the network 3 to access files and information located at a remote node in the network. Although FIG. 1 shows an environment with just several machines, the invention described below is designed to be implemented in any distributed computing environment domain having any number of machines, and these machines may be located in different geographic locations. For illustrative purposes, the remainder of the detailed discussion is directed to a DCE domain or "cell", although the teachings of the invention are applicable to any distributed computing environment.

Figure 2:
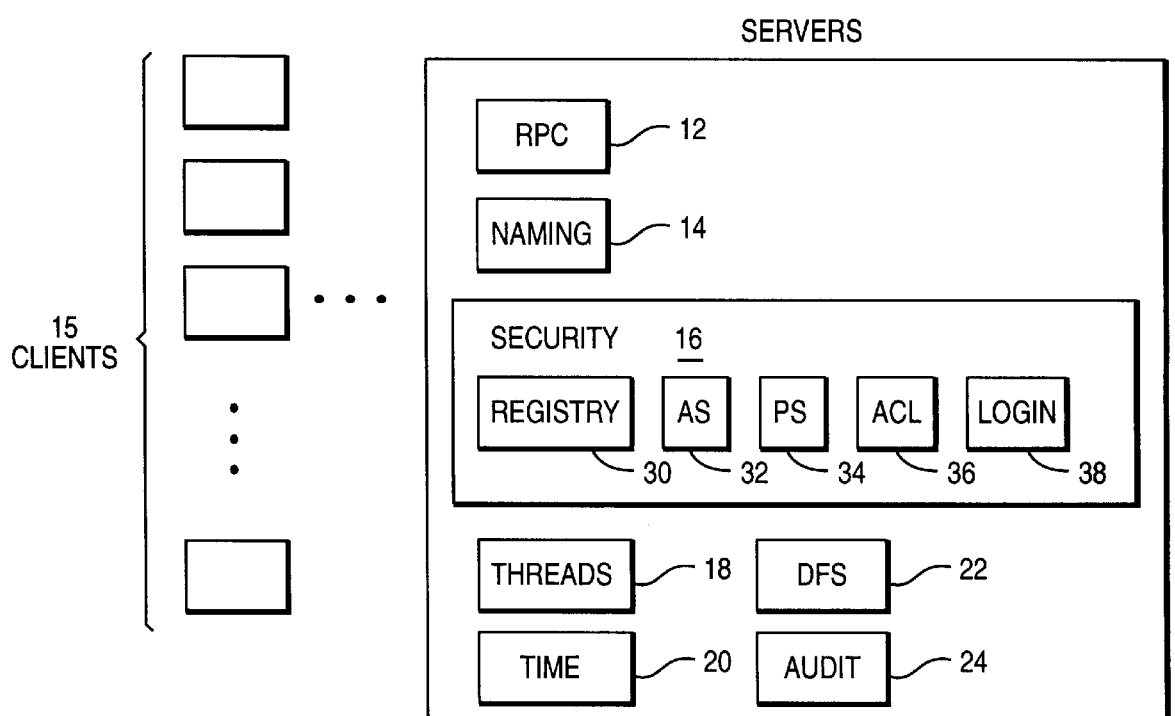
FIG. 2 illustrates the various servers used in the distributed computing environment of FIG. 1.

A representative DCE cell is shown symbolically in FIG. 2 and comprises a set of connected machines, including at least one server and the DCE clients, which share a common cell name and a namespace. The cell typically includes server machines that provide distributed services that support the development, use and maintenance of distributed applications in a heterogeneous networked environment. These include a remote procedure call (RPC) Service 12, a Naming (Directory) Service 14, a Security Service 16, a Threads Service 18, a Time Service 20 and a Distributed File System (DFS) Service 22. As is well-known, the RPC Service 12 (which is typically not a standalone server) implements the network protocols by which the client and server sides of an application communicate. The Naming Service 14 provides a central repository for information about resources in the system. The Security Service 16 provides secure communications and controlled access to resources in the system. The Threads Service 18 supports the creation, management and synchronization of multiple threads of control within a single process. The Time Service 20 synchronizes time on the computers. The DFS Service 22 allows users to access and share files stored on a file server anywhere in the network without having to know the physical location of the file.

Figure 3:
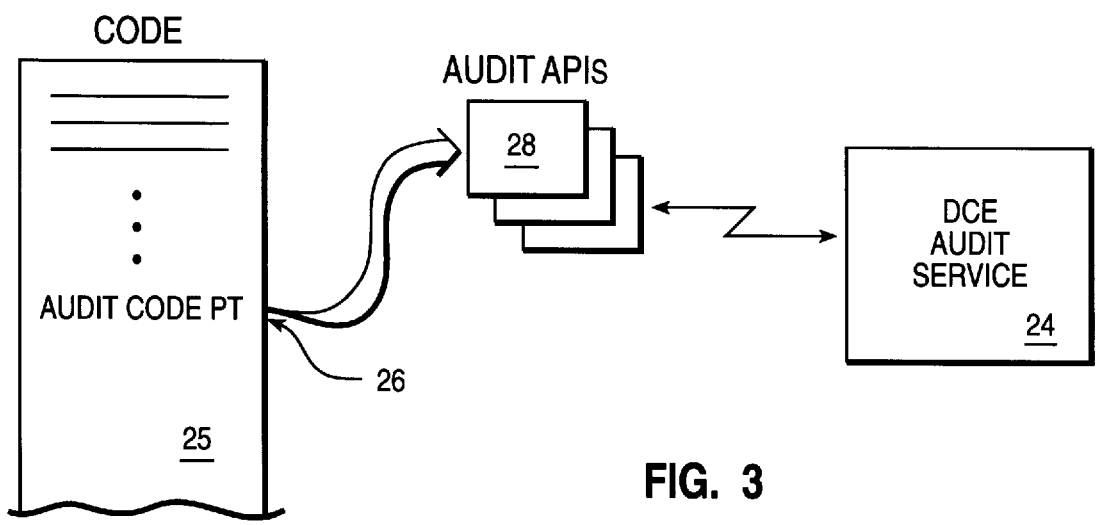
FIG. 3 shows a simplified representation of how audit code points trigger audit API's to process audit requests to an audit service.

The distributed computing environment of FIG. 2 also includes a centralized Audit Service 24 as depicted. All RPC-based servers are considered as audit clients, as are user-written application servers. The Audit Service is also considered an audit client. The Audit Service 24 is used to write or log an audit record through Audit application programming interfaces (APIs). Audit APIs are called by audit "code points" in the application servers. Audit code points typically correspond to operations or functions offered by the application server for which audit is recorded. This is illustrated in FIG. 3, which shows a code fragment 25 having an audit code point 26 embedded therein for calling an audit API 28 which, in turn, passes audit data to the Audit Service 24.

Referring back to FIG. 2, the DCE Security Service 16 includes a Registry Service 30, an Authentication Service or AS 32, a Privilege Service 34, an Access Control List (ACL) Facility 36, and a Login Facility 38. The identity of a DCE user or service is verified, or authenticated, by the Authentication Service 32. Access to resources is controlled by comparing the "credentials" conferred to a user by the Privilege Service 34 with the rights to the resource, which are specified in the resource's Access Control List stored in Facility 36. The Login Facility 38 initializes a user's security environment, preferably through a Kerberos protocol as will be discussed, and the Registry Service 30 manages the information (such as user accounts) in the DCE Security database.

As indicated above, the DCE Login facility (sometimes called $dce_{13}$ login) implements a known cryptographic protocol called Kerberos V5(KRB5). In Kerberos authentication schemes, the authentication server (AS) uses a key shared between a user's workstation and the server to encrypt a "ticket" that, upon successful decryption by a workstation, gives the workstation the ability to access services in the network. The shared key used to encrypt the ticket is based on the user's password. The authentication server knows the password because it is stored there; the workstation learns the password because the user types it in at login. Typically, a one-way hash of the password is used to form the shared key since the password is an alphanumeric string and the key is usually a number.

Figure 4:
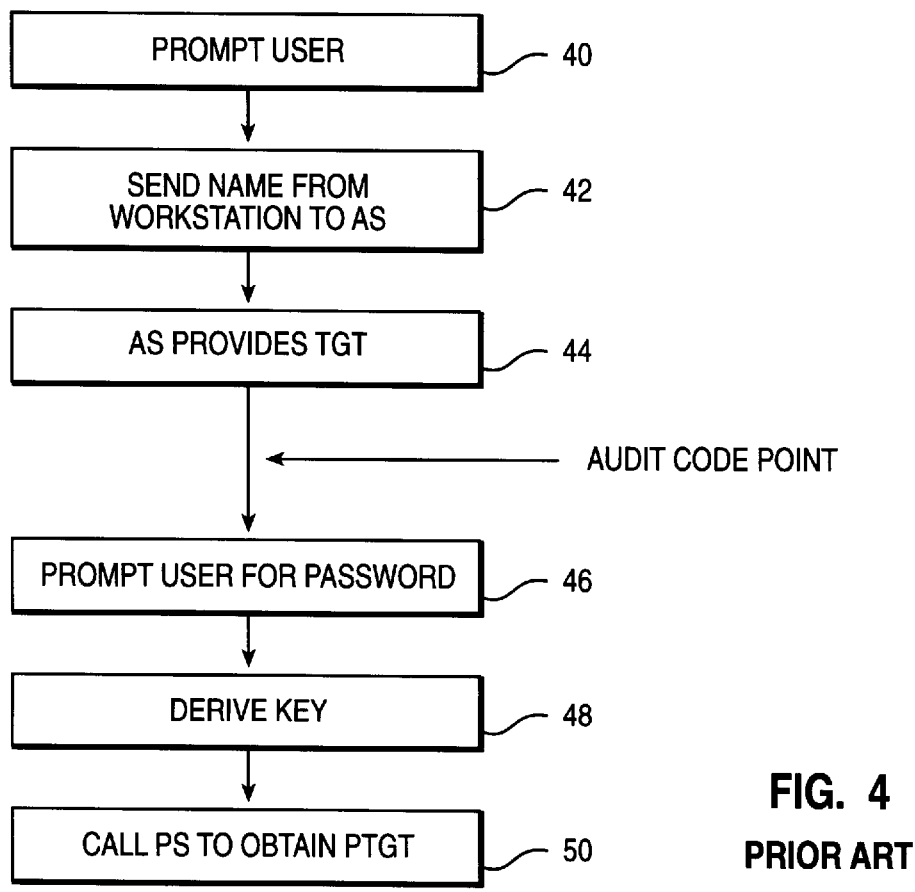
FIG. 4 is a flowchart showing a conventional DCE login routine for use in enabling a user of a workstation to log into the distributed computing environment using a Kerberos authentication scheme.

This known scheme is illustrated in FIG. 4. The login routine begins at step 40, wherein the user is prompted for a user login name. At step 42, this name is sent to the authentication server AS (via a Kerberos Authentication Service Request (KRB__AS__REQ)). The AS responds at step 44 (via a Kerberos Authentication Service Reply (KRB__AS__REP)) by providing a "ticket granting ticket" (TGT) encrypted with the user's key. A TGT is a data structure that contains authentication and Kerberos ticket information for a so-called "principal," encrypted in a key of a key distribution center (KDC), which is part of the authentication server AS. The encrypted portion of the TGT also contains a session key associated with the TGT. At step 46, the login facility then prompts for a password. At step 48, the user's key is derived (at the workstation) from the password entered by the user and, if this successfully decrypts the TGT, the TGT may be used to request further services. After this point, the session key associated with the TGT is used instead of the user's original key. Typically, the TGT and the accompanying session key have a limited duration. At step 50, a call is made to the Privilege Server to obtain a Privilege Ticket Granting Ticket (PTGT), which includes the user's Privilege Attribute Certificate (PAC) containing user-specific authorization information. The PAC is a user "credential."

In a conventional Kerberos scheme, two low level routines, called process__as__req( ) and process__tgs__as req( ), are called quite frequently. The OSF DCE authentication interface recognizes this fact and suggests the use of audit code points when these low level routines are called. According to the specification, respective Audit APIs, dce__aud__start and dce__aud__commit, are designed to be called at these code points. The present invention, as will be seen, modifies this interface and takes advantage of an additional protocol, called "pre-authentication," to enable the DCE Security Service 16 to provide login auditing.

In particular, it is also known that the authentication server may require proof that the user's workstation already knows the password before retiring a ticket encrypted with the password as the key. The Kerberos V5 (KRB5) protocol allows the initial authentication request to carry optional "pre-authentication" data. Pre-authentication is a protocol used in requesting Kerberos TGT's in which the workstation (i.e. the login node) must supply proof of identity as part of the request. Two such schemes have been implemented in DCE 1.1.

In the first known scheme, called PADATA-ENC-TIMESTAMPS, a timestamp is encrypted under the user principal's key and sent with the TGT request as proof that the login node has access to the user's password. The second scheme relies upon the fact that DCE systems have their own keys. In this scheme, called PADATA-ENC-THIRD-PARTY, the pre-authentication data includes the login-system's TGT, a random key encrypted under the session key from the TGT, and a timestamp encrypted first under the user's key and then again under the random key. On receipt of the request (including this pre-authentication data), the KDC in the AS decrypts the TGT to find the session key, uses that key to decrypt the random key, and uses the random key and the claimed principal's key to decrypt the timestamp. If the timestamp is valid, the KDC knows that the login-system has access to the user's password and constructs a TGT and session key protected under the random key. According to the invention, it is envisioned that either type of pre-authentication scheme is used, although other pre-authentication data may be provided as well to trigger the auditing activity.

Thus, the Kerberos authentication protocol provides a means whereby certain pre-authentication data may be provided by a workstation along with a Kerberos encrypted-credential request, for the purpose of allowing the authentication server to gain some assurance that the workstation is actually entitled to the credentials. This pre-authentication data is used in the present invention to facilitate auditing of login activity, as will now be described.

The inventive audit scheme is preferably carried out as a background process to dce_login. Audit code points are set after the low level KBR5 routines are carried out to delay calling the Audit API, thereby avoiding RPC deadlocks that might otherwise occur were the code points set as provided in the OSF DCE authentication audit interface specification. Whenever pre-authentication is provided to the AS at a login node, the audit login routine "parses" or decrypts the pre-authentication data, and then uses this information to begin the auditing function.

Figure 5:
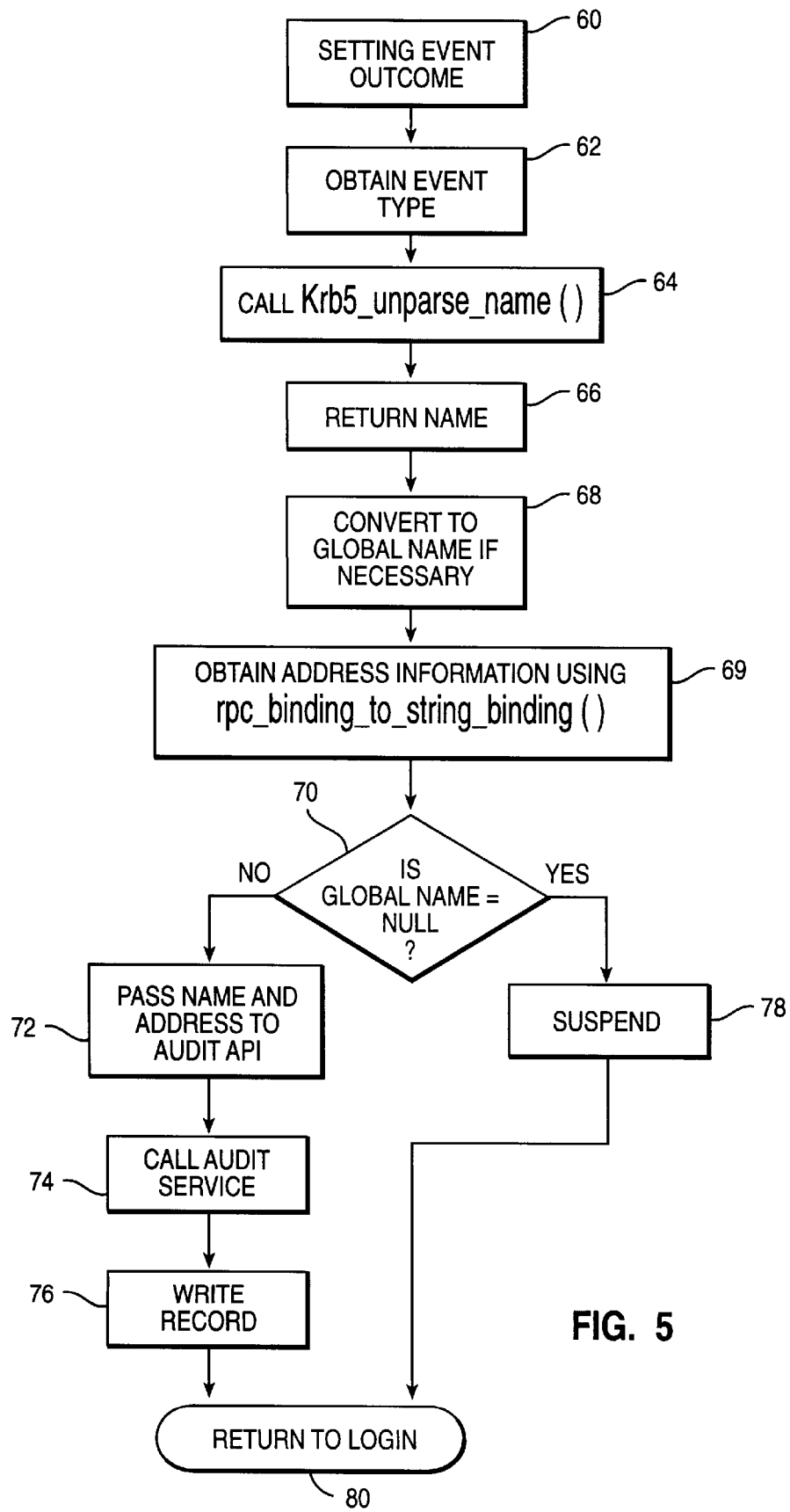
FIG. 5 is a flowchart showing the audit routine of the present invention that is preferably carried out as a background process during the DCE login routine of FIG. 4.

The inventive routine, illustrated in the flowchart of FIG. 5, is implemented each time pre-authentication data is provided as part of the Kerberos scheme. If the pre-authentication data is not valid, generally there will be no need to audit the login attempt.

Initially, it should be remembered that the login routine is, in effect, "delayed" relative to the audit API calls prescribed in the OSF DCE authentication audit interface by setting the audit code points after the AS and TGS (Ticket Granting Service) low level functions, which occur upon initiation of the Kerberos protocol. This is illustrated in FIG. 4 by placing the audit code point after box 44, although this precise placement is not meant to be taken as limiting. All that is required is that the code points come after the low level KRB5 functions. Because of the placement of the audit code points in this manner, it is necessary for the routine to ascertain the purported outcome of a login attempt. The audit login routine thus begins at step 60 by setting an event outcome in response to a user's request for credentials. Whether the user's request is granted or denied depends on the password supplied, but at this point in time (since authentication has not been fully established) the AS has sent back a KDC (key distribution center) value flag indicating one of three states: KDC_EER_NONE, indicating the user and the supplied password are valid, KDC_PREAUTH_FAILED, indicating that the user is not authorized to login or that the password is incorrect, or a default state, indicating some failure in the procedure or mechanism. At step 62, the routine obtains an "Event Type" from a flag of the pre-authentication data. Several Event Types may be identified to the Security Service (and tracked for auditing purposes). During a typical login, for example, such events include: KRB_AS_REQ (which, as described above, is a standard Kerberos message from a client to the AS requesting a TGT) and KRB_AS_REP (a standard reply to a client from the AS in response to a request). Other Event Types include TGS_RenewReq, a request to renew a TGT, and TGS_ValidateReq, a request to validate a TGT. The latter events typically occur after login.

As can be seen, preferably the audit login routine begins after the AS request and TGS request are completed, i.e. after the ticket is sent back to the requester. This operation is achieved by setting the audit code points after the AS and TGS messages, and serves to avoid bottlenecks that would otherwise be caused by the remote procedure calls that are going on in the main foreground processing of the Kerberos V5 protocol.

Thus, initially the audit routine obtains the event outcome and event type information. Therefore, at this stage the pre-authentication contains only the requester's name and address. The requester's name (i.e. the user seeking to login) is stored in a data structure, krb5_const_principal, in the AS. To retrieve it, the audit routine continues at step 64 by calling a routine, krb5_unparse_name( ), with request→client as its input. At step 66, the krb5_unparse_name( ) function returns the requester's name in an output string. If the output string is a simple or "intracell" string (e.g., name@cell), it is then converted to a global or "intercell" name format (e.g., /.:/cell/name) at step 68. This step enables auditing of login activity by users from outside the cell itself. Of course, the conversion of simple to global naming conventions is not required if the auditing is only being performed on an "intracell" basis, but typically this will not be the case.

In particular, it is known that a DCE client provides a mechanism for specifying path variables which allow a pathname to vary depending on the value of the variables. One such path variable is @sys. The @sys variable typically has a value indicating a hardware/software combination for a platform. For example, the @sys value for DFS on AIX version 3.2 on the RS/6000 is rs_aix32. The @sys variable is commonly used as a switch in file system paths to binaries for particular platforms. For example, /:/local/bin may really be a symbolic link to /:/local/@sys/bin. For AIX, the path, after substitution, would be /:/local/rs_aix32/bin. Notice that the (/) is used to separate the component whereas @ is used to separate the realm from the rest of the name. Therefore, if '/', '@', or '\0' appears in any component, they must be represented using backward slash encoding, namely, '\/', '\@', '\0' respectively.

Thus, the audit routine obtains the login information using the pre-authentication data. The data, identified as pre_authentication data (pdata), is sent to either function decode_krb5_as_req( ) or function decode_krb5_tgs_req( ) depending on the AS or TGS flag that is set to decode the pdata into the krb5_kdc_req structure (namely as_req or tgs_req). Then, as_req→client or tgs_req→client is passed to krb5_unparse_name( ) to unparse the login name into simple name format (e.g., name@cell). The requester's name is thus obtained in simple format and, if necessary, converted to global form. The requester's address is obtained from the RPC service at step 69, using a function rpc_binding_to_string_binding( ). At step 70, a test is then performed to determine whether the global name is NULL (meaning that it is not valid). If the outcome of the test at step 70 is negative, then the routine continues at step 72 to pass the name and address information to an appropriate Audit application programming interface (API), such as dce_aud_commit( ). At step 74, the audit system API calls the Audit Service, which at step 76 writes an audit record (including the event type and outcome information) to an audit trail file. However, if the outcome of the test at step 70 is valid, indicating that the simple name returned from krb5_unparse_name( ) is a NULL string, the audit process is terminated (with respect to this login audit) at step 78 to avoid a deadlock that would otherwise occur since the Audit Service would seek to use the function dce_aud_commit( ) to call the Security API to decode audit data. Thus, if krb5_unparse_name( ) returns a NULL string, the function dce_aud_commit( ) is not initiated; instead, the audit procedure is suspended as to this particular login. After writing an audit record or suspending the audit, as the case may be, process control is returned to the dce_login routine at step 80 to complete the audit login protocol.

Thus, according to the preferred embodiment of the invention, pre-authentication data is used to obtain login information in a background process during DCE login. The audit login routine, however, does not begin operating until after workstation has provided proof that it knows the user's password and the AS has delivered the encryption key or "ticket" back to the requester, thereby avoiding RPC bottlenecks while the foreground and background processes are carried out. A mechanism is also provided to prevent deadlocks that might occur if the audit logging service seeks to obtain a cell UUID of a client that cannot be identified.

A preferred routine for carrying out the present invention is shown below.

```
#ifdef DCE_AUD_POINT
{
        unsigned32              ast;
        dce_aud_rec_t           ard;
        krb5_kdc_req            *as_req;
        krb5_kdc_req            *tgs_req;
        char                    *str;
        char                    *simplename       = NULL;
        char                    *fromaddr         = NULL;
        char                    *global_client_name = NULL;
        unsigned32              aud_even_type;
        unsigned32              aud_outcome_type;
        /* set the event outcome */
        if (err != 0)
                aud_outcome_type=aud_s_esl_cond_failure;
        else
                aud_outcome_type=aud_s_esl_cond_success;
        /* set the evens type */
        if (krb5_is_as_req(&pkt) {
        aud_even_type =AS_Request;
        /* decode the as type */
        decode_krb5_as_req(&pkt, &as_req);
        /* get the requester's name */
        if (as_req->client)
                krb5_unparse_name(as_req->client, &simplename);
        } else if krb5_is_tgs_req(&pkt)) {
        /* decode the tgs type */
        decode_krb5_tgs_req(&pkt, &tgs_req);
        if (tgs_req_client) {
                /*get the requester's name */
                krb5_unparse_name(tgs_req->cl ient, &simplename);
                if (tgs_req->kdc_options & KDC_OPT_RENEW)
                aud_even_type = TGS_RenewReq;
                else if (tgs_req->kdc_options & KDC_OPT_VALIDATE)
                aud_event_type = TGS_ValidateReq;
                else
                aud_even_type = TGS_TicketReq;
        }
        }
        /* convert the simplename to global name */
        global_client_name = simplename
        if (global_client_name = = NULL) {
        return;
        } else{
        str = strchr(global_client_name, '\0');
        while (str > global_client_name && *str != '@' && *(--str)
!= '\\');
        *str = '\0';
        free(str);
        }
        /* obtain the requester's address */
        fromaddr addr.contents;
        /* start the audit */
        dce_aud_start_with_name(aud_even_type, global_client_
name,
                        fromaddr, 0, aud_outcome_type, &ard, &ast);
        if(ard)
        dce_aud_commit(sec_aud_trail, ard, aud_c_evt_com-
        mit_sync_no_wait,
                        1, aud_outcome_type, &ast);
        if (krb5_is_as_req(&pkt))
        krb5_free_kdc_req(as_req);
        if (krb5_is_tgs_req(&pkt))
        krb5_free_kdc_req(tgs_req);
        if (global_client_name)
        free(global_client_name);
        if (simplename)
        free(simplename);
        if (fromaddr)
        free(fromaddr);
        }
        #endif
```

One of the preferred implementations of the audit routine is as a set of program instructions in a code module resident in the random access memory of a workstation computer. This program code is executed by the operating system, under the control of a processor. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred in a specific operating system and network environment, those skilled in the art will recognize that the invention can be practiced, with modification, in other and different operating systems and network architectures within the spirit and scope of the appended claims. The invention is not to be construed as limited to the OSF DCE architecture or to Kerberos-based authentication, and thus in a more general sense the invention should be broadly construed to cover any mechanism which uses pre-authentication data to facilitate login audit in a distributed computing environment, preferably within the security service.

As used herein, the "ticket request" communicated from a workstation to an authentication server should be broadly construed to cover any form of message, token, data or other communication provided by a user and/or workstation within the context of an authentication protocol to establish identity and/or authorization. Likewise, the "ticket" provided by the authentication server to the workstation should be broadly construed to cover any form of message, token, data or other information that can be decrypted by the workstation in order to facilitate access to services in the distributed computing environment. Further, "pre-authentication" should be broadly construed to cover the providing of any type of information that verifies the identity of a user and/or provides a proof that the user has entered a password.

Having thus described our invention, what we claim as new and desire to secure by letters patent is set forth in the following claims:

What is claimed is:

1. A method of auditing login activity in a distributed computing environment in which users attempt to log into the environment from workstations using an authentication protocol in which a ticket request and pre-authentication data are communicated from the workstation to an authentication server, the pre-authentication data including information establishing an identity of the user and providing a proof that the user has entered a password during the login attempt; comprising the steps of:

during a login routine, determining whether a ticket has been returned from the server in response to the ticket request; and if a ticket has been returned from the server, suspending the login routine and using information derived from the pre-authentication data to initiate a login audit.

2. The method as described in claim 1 wherein the step of initiating a login audit includes the steps of:

determining whether naming information can be provided to an audit service of the distributing computing environment without causing RPC deadlock; and if the naming information can be provided without causing RPC deadlock, calling an audit API.

3. The method as described in claim 2 further including the step of completing the login audit by having the audit API pass the naming information to the audit service.

4. The method as described in claim 3 further including the steps of:

obtaining an address of a workstation at which the login attempt is occurring; and having the audit API pass the address to the audit service.

5. The method as described in claim 4 further including the step of transferring process control back to the login routine after the audit API passes the naming information or the address to the audit service.

6. The method as described in claim 1 wherein the authentication protocol is Kerberos.

7. The method as described in claim 2 wherein the step of determining whether naming information can be provided to an audit service without causing RPC deadlock includes the steps of:

obtaining a name of the user in a first format;

converting the user's name from the first format to a second format; and evaluating whether the user's name in the second format is valid.

8. The method as described in claim 7 wherein the first format is an intracell name and the second format is an intercell name.

9. A method of auditing login activity in a distributed computing environment in which users attempt to log into the environment from workstations using an authentication protocol in which a ticket request and pre-authentication data are communicated from the workstation to an authentication server, the pre-authentication data including information establishing an identity of the user and providing a proof that the user has entered a password during the login attempt; comprising the steps of:

during a login routine, determining whether a ticket has been returned from the server in response to the ticket request;

if a ticket has been returned from the server, suspending the login routine and using information derived from the pre-authentication data to initiate a login audit protocol;

returning process control back to the login routine after processing the login audit protocol.

10. The method as described in claim 9 wherein the login audit protocol includes the steps of:

determining whether naming information can be provided to an audit service of the distributing computing environment without causing RPC deadlock;

if the naming information can be provided without causing RPC deadlock, calling an audit API; and having the audit API pass the naming information to the audit service.

11. The method as described in claim 9 wherein the login audit protocol includes the steps of:

determining whether naming information can be provided to an audit service of the distributing computing environment without causing RPC deadlock;

if the naming information cannot be provided without causing RPC deadlock, suspending the audit.

12. The method as described in claim 9 wherein the authentication protocol is Kerberos.

13. The method as described in claim 10 wherein the step of determining whether naming information can be provided to an audit service without causing RPC deadlock includes the steps of:

obtaining a simple name of the user;

converting the user's simple name to a global name format; and evaluating whether the user's global name is valid.

14. A computer connected in a distributed computing environment having an authentication server, the computer comprising:

a processor;

an operating system;

program control means run by the operating system, comprising:

means operative during a login routine for determining whether predetermined information has been returned from the authentication server in response to an authentication request;

means responsive to the determining means for suspending the login routine and initiating a login audit protocol; and means for processing the login audit protocol; and means for returning process control back to the login routine after processing the login audit protocol.

15. The computer as described in claim 14 wherein the means for processing the login audit protocol includes means for controlling an audit API to pass naming information to an audit service.

16. The computer as described in claim 15 wherein the means for processing the login audit protocol includes means for suspending an audit under predetermined circumstances.

17. The computer as described in claim 14 wherein the authentication server uses a Kerberos authentication protocol.

18. An article of manufacture for use in a computer, comprising:

a computer-readable storage medium having a substrate; and computer program data encoded in the substrate of the computer-readable storage medium, wherein the storage medium so configured enables a user of the computer to connect the computer into a distributed computing environment having an authentication server, the computer program data comprising:

means operative during a login routine for determining whether predetermined information has been returned from the server in response to an authentication request;

means responsive to the determining means for suspending the login routine and initiating a login audit protocol;

means for processing the login audit protocol; and means for returning process control back to the login routine after processing the login audit protocol.

19. The article of manufacture as described in claim 18 wherein the means for processing the login audit protocol includes means for controlling an audit API to pass naming information to an audit service.

20. The article of manufacture as described in claim 18 wherein the means for processing the login audit protocol further includes means for suspending an audit under predetermined circumstances.

* * * * *